US009367339B2

(12) United States Patent
Potlapally et al.

(10) Patent No.: US 9,367,339 B2
(45) Date of Patent: Jun. 14, 2016

(54) CRYPTOGRAPHICALLY ATTESTED RESOURCES FOR HOSTING VIRTUAL MACHINES

(71) Applicant: Amazon Technologies, Inc., Reno, NV (US)

(72) Inventors: Nachiketh Rao Potlapally, Arlington, VA (US); Eric Jason Brandwine, Haymarket, VA (US); Matthew Shawn Wilson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 321 days.

(21) Appl. No.: 13/932,828

(22) Filed: Jul. 1, 2013

(65) Prior Publication Data

US 2015/0007175 A1    Jan. 1, 2015

(51) Int. Cl.
| | |
|---|---|
| G06F 9/455 | (2006.01) |
| G06F 9/50 | (2006.01) |
| G06F 12/14 | (2006.01) |
| H04L 9/08 | (2006.01) |
| H04L 9/32 | (2006.01) |
| H04L 29/06 | (2006.01) |
| G06F 21/57 | (2013.01) |

(52) U.S. Cl.
CPC ............ *G06F 9/455* (2013.01); *G06F 9/45558* (2013.01); *G06F 9/5077* (2013.01); *G06F 12/14* (2013.01); *G06F 12/145* (2013.01); *G06F 21/57* (2013.01); *G06F 2009/45562* (2013.01); *G06F 2009/45587* (2013.01); *H04L 9/08* (2013.01); *H04L 9/32* (2013.01); *H04L 63/04* (2013.01)

(58) Field of Classification Search
None
See application file for complete search history.

(56) References Cited

U.S. PATENT DOCUMENTS

| | | | |
|---|---|---|---|
| 2005/0071282 A1 | 3/2005 | Lu et al. | |
| 2011/0289168 A1 | 11/2011 | Allam et al. | |
| 2012/0179904 A1 | 7/2012 | Dunn et al. | |
| 2013/0097660 A1 | 4/2013 | Das et al. | |
| 2014/0032920 A1* | 1/2014 | Gehrmann et al. | ........... 713/176 |

FOREIGN PATENT DOCUMENTS

| | | |
|---|---|---|
| WO | WO 2012148324 A1 * | 11/2012 |
| WO | 2015/002992 | 1/2015 |

OTHER PUBLICATIONS

International Search Written Opinion dated Oct. 31, 2014, received in PCT/US2014/045125.

* cited by examiner

*Primary Examiner* — Qing Wu

(57) ABSTRACT

Approaches to enable the configuration of computing resources for executing virtual machines on behalf of users to be cryptographically attested to or verified. When a user requests a virtual machine to be provisioned, an operator of the virtualized computing environment can initiate a two phase launch of the virtual machine. In the first phase, the operator provisions the virtual machine on a host computing device and obtains cryptographic measurements of the software and/or hardware resources on the host computing device. The operator may then provide those cryptographic measurements to the user that requested the virtual machine. If the user approves the cryptographic measurements, the operator may proceed with the second phase and actually launch the virtual machine on the host. In some cases, operator may compare the cryptographic measurements to a list of approved measurements to determine whether the host computing device is acceptable for hosting the virtual machine.

20 Claims, 10 Drawing Sheets

CRYPTOGRAPHICALLY ATTESTED RESOURCES FOR HOSTING VIRTUAL MACHINES

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances (i.e. virtual machines) that are associated with (e.g., owned by) a particular user (e.g., customer). Each virtual machine conventionally includes its own operating system that is capable of executing one or more applications on behalf of the user. Virtualization can thus enable various users to run their applications remotely, using on the resources (e.g., host servers, etc.) of the cloud computing provider or operator. However, providing a conventional virtual computing environment has a number of limitations. For example, certain customers may be particularly sensitive to security issues that may arise as a result of executing virtual machines on remote resources. Because customers do not have physical access to these resources, many customers would like to obtain some sort of cryptographic assurance that the resources have not been tampered with by malicious users or otherwise compromised.

BRIEF DESCRIPTION OF THE DRAWINGS

Various embodiments in accordance with the present disclosure will be described with reference to the drawings, in which.

DETAILED DESCRIPTION

Figure 1:
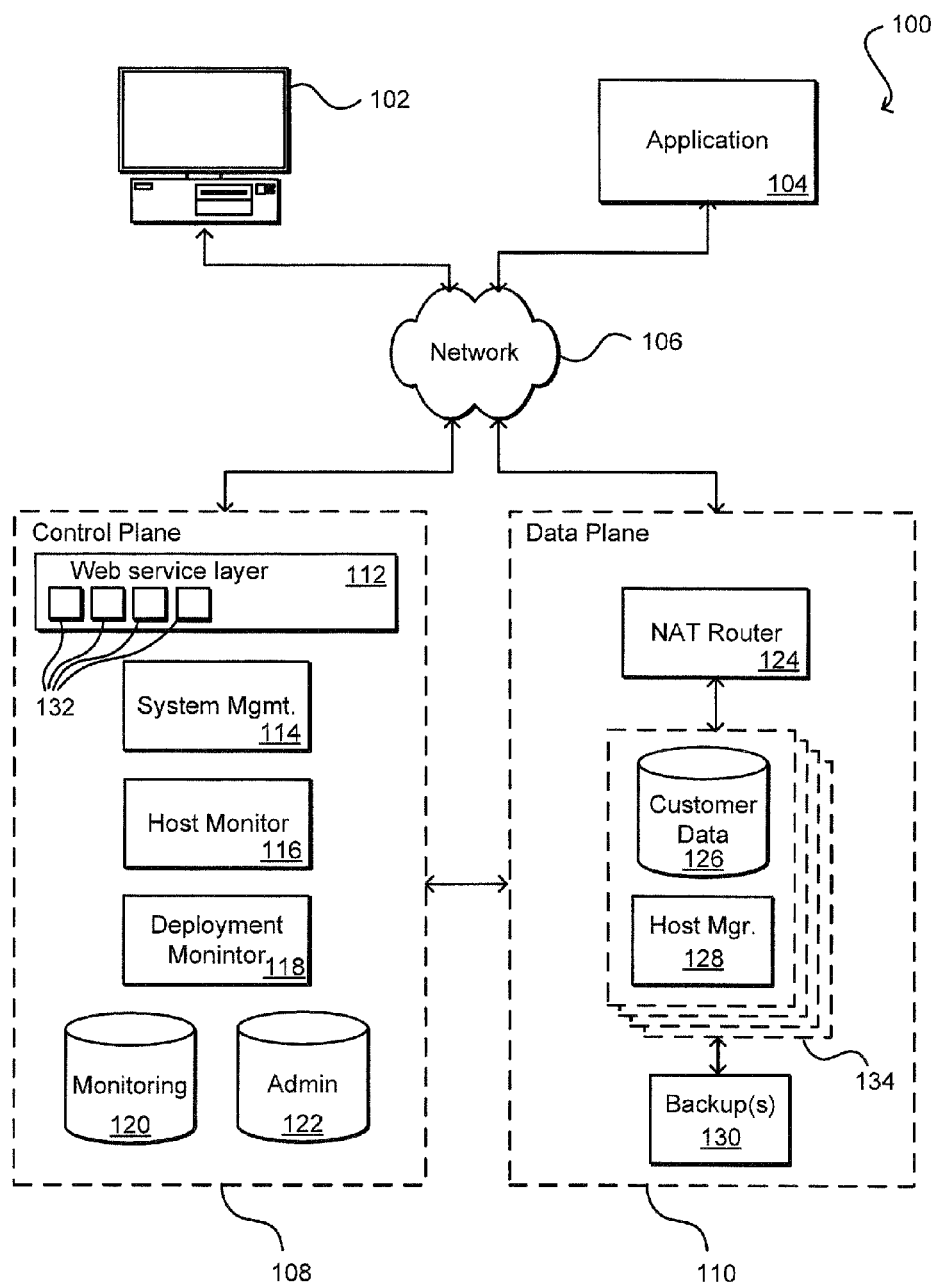
FIG. 1 illustrates an example of an electronic resource environment that can be used in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for cryptographically attesting computing resources. In particular, various embodiments enable an operator of a virtualized multitenant computing environment to cryptographically attest to and/or verify the configuration of computing resources used to execute one or more virtual machines on behalf of a user (e.g., customer, client, etc.). When the user requests a virtual machine to be provisioned for the user, the operator of the virtualized computing environment (e.g., cloud computing service provider) can initiate a two phase launch of the virtual machine. In the first phase, the operator may provision the virtual machine on a host computing device and then obtain cryptographic measurements of the software and/or hardware resources on the host computing device. The cryptographic measurements may be obtained using a trusted platform module (TPM) and be stored in the platform configuration registers (PCRs) of the TPM. The operator may then provide the cryptographic measurements to the user that requested the virtual machine. If the user approves the cryptographic measurements, the operator may proceed with the second phase and actually launch (i.e., begin executing) the virtual machine on the host computing devices. In some embodiments, instead of (or in addition to) providing the cryptographic measurements to the user, the operator may compare the cryptographic measurements to a known measurement or a list of approved measurements (e.g., a "whitelist") or other reference values to determine whether the host computing device is acceptable for hosting the virtual machine. The list of approved cryptographic measurements may be provided by the user as part of the request to provision the virtual machine or may be provided by a trusted entity (e.g., trusted third party).

In accordance with an embodiment, the user submits a request for a virtual machine by using one or more application programming interfaces (APIs), such as a Web Services API provided by the operator of the virtualized multitenant computing environment. In some embodiments, as part of submitting the request, the user may specify a particular configuration of the host computing device or provide a list of approved cryptographic measurements to be used when provisioning the virtual machine. In response to receiving such a request from the user, the operator (e.g., a service running on a server) can begin provisioning the virtual machine for the user. In particular, provisioning the virtual machine may include selecting a host computing device, unpacking the machine image containing the configuration of the virtual machine, and performing any other necessary steps to provision the virtual machine for the user. Once the virtual machine has been provisioned and is ready to be launched (i.e., executed) on the host computing device, the process may be paused and one or more cryptographic measurements of the various software and/or hardware resources on the host computing device can be obtained. For example, a trusted platform module (TPM) or other cryptographic module on the host computing device may be used to create a hash measurement of the software configuration of the host computing device. Hash measurements can be created by reading values in certain memory locations and applying a hash function to those values to generate the hash measurement. The memory locations may be associated with the Basic Input/Output System (BIOS) of the host computing device, a hypervisor (or virtual machine manager) on the host computing device, the configuration of the guest operating system of the virtual machine, the hardware configuration registers, the firmware on a peripheral component interconnect (PCI) card and others. In one embodiment, the hash measurement is a secure hash algorithm 1 (SHA-1) measurement that is stored in the PCRs of the TPM.

Once the cryptographic measurements have been obtained, they can be used to determine whether the resources on the host computing device are in an acceptable state to launch the virtual machine. In one embodiment, the operator of the virtualized multitenant computing environment may provide the cryptographic measurements (e.g., SHA-1) to the user that requested the virtual machine and the user may approve or deny the cryptographic measurements prior to launching the virtual machine. In another embodiment, if the user has specified a particular configuration of the host computing device as part of the request, the operator may compare the cryptographic measurement of the host to a known and approved cryptographic measurement (e.g., a known SHA-1) that corresponds to the specified configuration. In another embodiment, if the user has provided a list of approved cryptographic measurements to the operator (e.g., as part of the request for the virtual machine or at a different time), the operator may compare the cryptographic measurement to the list of approved measurements to determine whether to approve launching the virtual machine or deny it. In some embodiments, the list of approved measurements may be attested to by a trusted third party such as by publishing the list for access by multiple users (e.g., on the Internet).

In various embodiments, if the operator determines that the cryptographic measurement of the configuration of the host computing device does not match any approved reference value, the operator can roll back or undo the process of provisioning the virtual machine on the host computing device. Alternatively, the operator may not provide the virtual machine to the user in other ways, such as by preventing the virtual machine from joining a virtual network of the user.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration (Admin) data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshaling or unmarshaling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

The control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine (VM) is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each virtual machine instance 134 in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored virtual machine instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or virtual machine instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once a virtual machine instance is provisioned and a user is provided with a DNS address or other address or location, the user can send requests "directly" to the data plane 110 through the network using a Java Database Connectivity (JDBC) or other such client to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108. For example, the user can directly issue SQL or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage virtual machine instances in the data plane, and can also monitor and ensure availability of those instances in a separate data plane 110.

Figure 2:
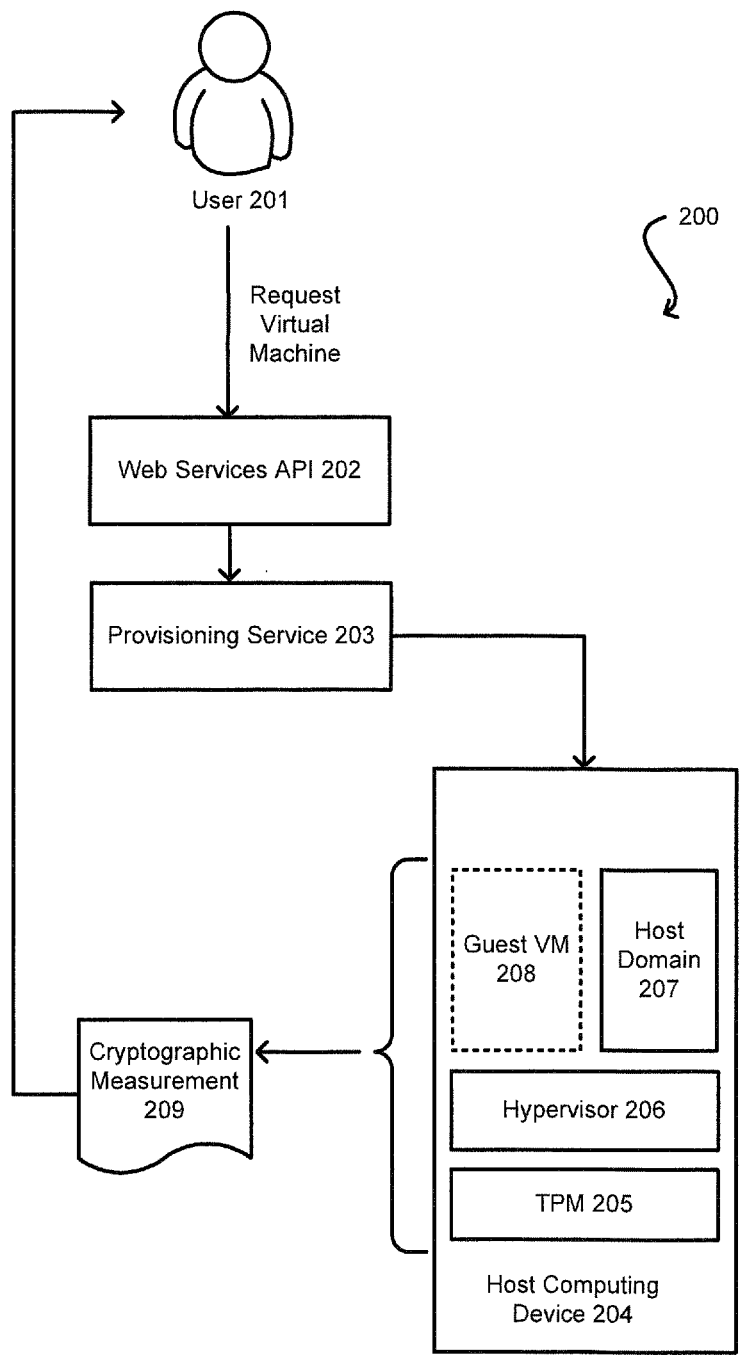
FIG. 2 illustrates an example of obtaining a cryptographic measurement of the resources on a host computing device on which a virtual machine is to be provisioned, in accordance with various embodiments.

FIG. 2 illustrates an example 200 of obtaining a cryptographic measurement of the resources on a host computing device on which a virtual machine is to be provisioned, in accordance with various embodiments. Certain users, such as user 201, may be particularly sensitive to security issues when requesting virtual machines to be provisioned in the multi-tenant environment (e.g., cloud computing environment). For example, it may be important to these users that they be able to measure the resource stack running the virtual machine (i.e., hypervisor, hardware, etc.), before the virtual machine is launched. This is because even completely valid virtual machines which have been booted from a non-tampered machine image but which are executing on a compromised host computing device may still be problematic, and may still compromise the user's infrastructure.

For these types of users, the operator of the multitenant environment can provide cryptographic assurance that the BIOS, hypervisor 308, host domain 207, guest virtual machine 308, boot operating system (OS), hardware configuration registers, firmware on a peripheral component interconnect (PCI) card and/or other resources on the host computing device 204 are in a particular configuration. If this is combined with a list of approved configurations or other reference values, the user 301 is able to verify that the resource infrastructure on the host computing device is uncompromised and acceptable for hosting the virtual machine.

In one embodiment, a two phase launch process can be implemented for provisioning a virtual machine. In the first phase, the user 201 requests the virtual machine using an API, such as Web Services API 202. The request may specify a particular configuration of the resources on the host computing device, where the configuration has corresponding known and approved measurement values associated therewith. In response to the request, the operator (e.g., provisioning service 203 running on a server) can begin the process for provisioning the virtual machine by selecting a host computing device 204 onto which to place the virtual machine, unpacking the machine image and the like. Once the virtual machine is provisioned and ready to be launched, one or more cryptographic measurements can be obtained of the configuration of the resources on the host computing device 204. For example, a TPM 205 can be used to generate hash measurements of the hypervisor 206, the host domain 207 and/or the configuration of the guest virtual machine 208. These cryptographic measurements can be provided to the user in response to the user's request. If the user approves the cryptographic measurements, they may accept the launch of the virtual machine (e.g., clicking "continue") and the instance launch completes. Alternatively, the user may deny the measurements (e.g., click "abort") and the process of provisioning the virtual machine is undone, or the virtual machine is otherwise not provided to the user.

In embodiments where the user has specified a particular configuration onto which their virtual machine should be hosted, the operator of the multitenant environment may retrieve a known and approved cryptographic measurement associated with the specified configuration. This approved measurement may also be attested by a trusted third party to provide the user assurance that the measurement is accurate. In these embodiments, rather than requiring the user to approve or deny the cryptographic measurement, the operator may retrieve the known/approved measurement and compare it to the cryptographic measurement of the host computing device. The information about the comparison may then be provided to the user. Alternatively, the user may still be provided with the option of approving or denying the request, along with an indication of whether the obtained cryptographic measurement matched the known/approved measurement.

Figure 3:
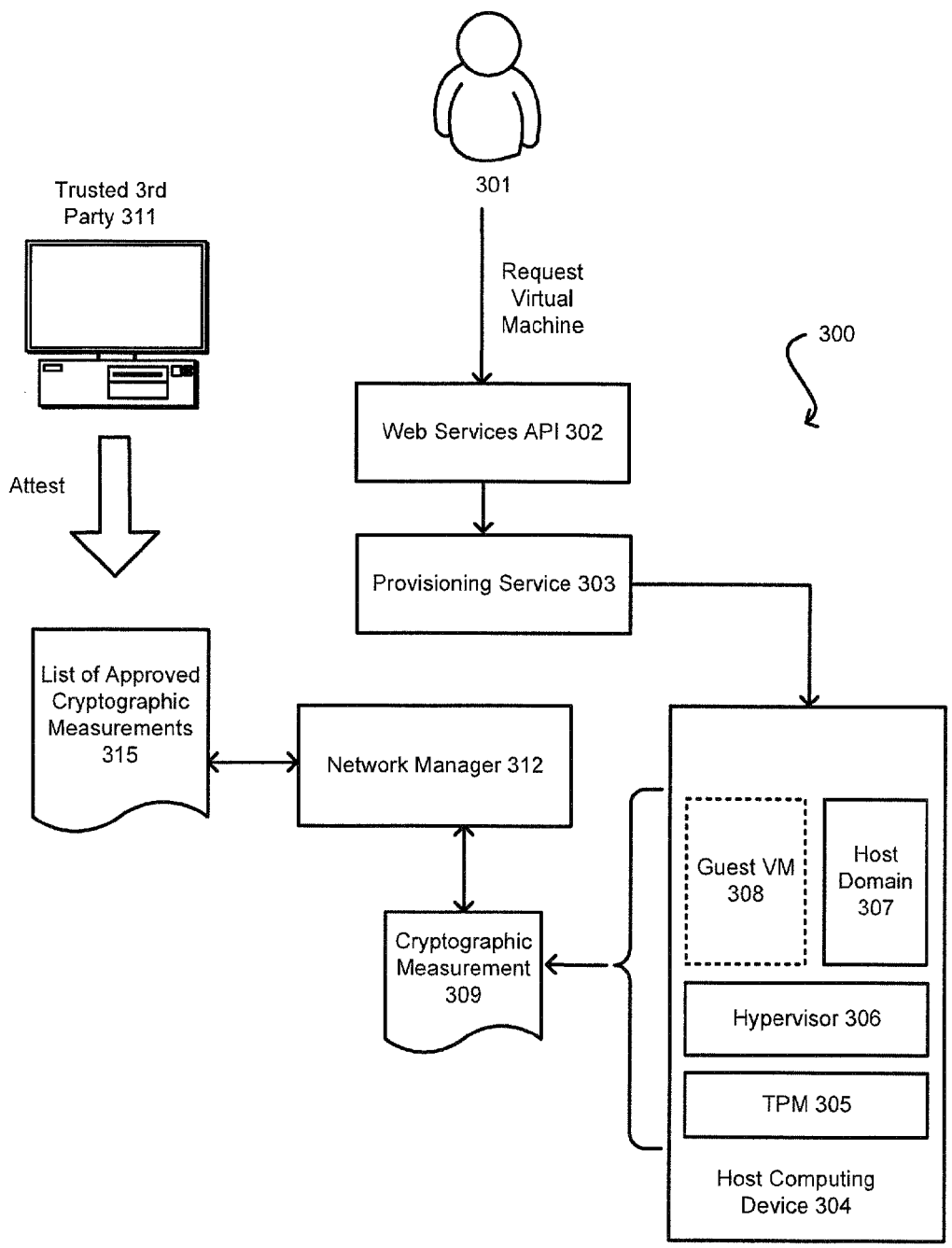
FIG. 3 illustrates an example of comparing the cryptographic measurement to a list of approved measurements that has been attested to by a trusted entity, in accordance with various embodiments.

FIG. 3 illustrates an example 300 of comparing the cryptographic measurement to a list of approved measurements that has been attested to by a trusted entity, in accordance with various embodiments. As previously described with reference to FIG. 2, the user 301 may use API 302 to submit a request for a virtual machine to be provisioned. The provisioning service 303 can select the host computing device 304 and provision the virtual machine 308 on the host computing device. Before launching the virtual machine, the process is suspended and a cryptographic measurement is obtained of the resources (e.g., hardware and/or software sources), such as by utilizing a TPM 305 on the host computing device 304. For example, the TPM 305 may be used in obtaining a hash measurement 309 of the software stack hosting the virtual machine 308, including but not limited to the hypervisor 306, and the host domain 307.

Once the cryptographic measurement 309 is obtained, it is provided to a network manager 312. The network manager 312 can retrieve a list of approved cryptographic measurements 315 and compare the cryptographic measurement 309 to the list of approved measurements 315. In some embodiments, the list of approved measurements 315 can be attested to by a trusted third party entity 311. For example, the operator of the multitenant environment may compile a list of all approved cryptographic measurements for each possible configuration of the host computing device. This list can be provided to the trusted third party 311 that inspects each cryptographic measurement and attests to its accuracy. Alternatively, the trusted third party 311 may generate the list of approved measurements based on obtaining access to the resources of the operator. The trusted party 311 may further publish this list of approved measurements 315 for access by various users, such as user 301. This can make it easier for the user 301 in the sense that the user does not need to determine which cryptographic measurements are acceptable for launching their virtual machines and which are not. The user 301 can trust the trusted party 311 on the assumption that it is an independent third party which has verified the measurements and affirmed that they are valid and accurate.

Figure 4:
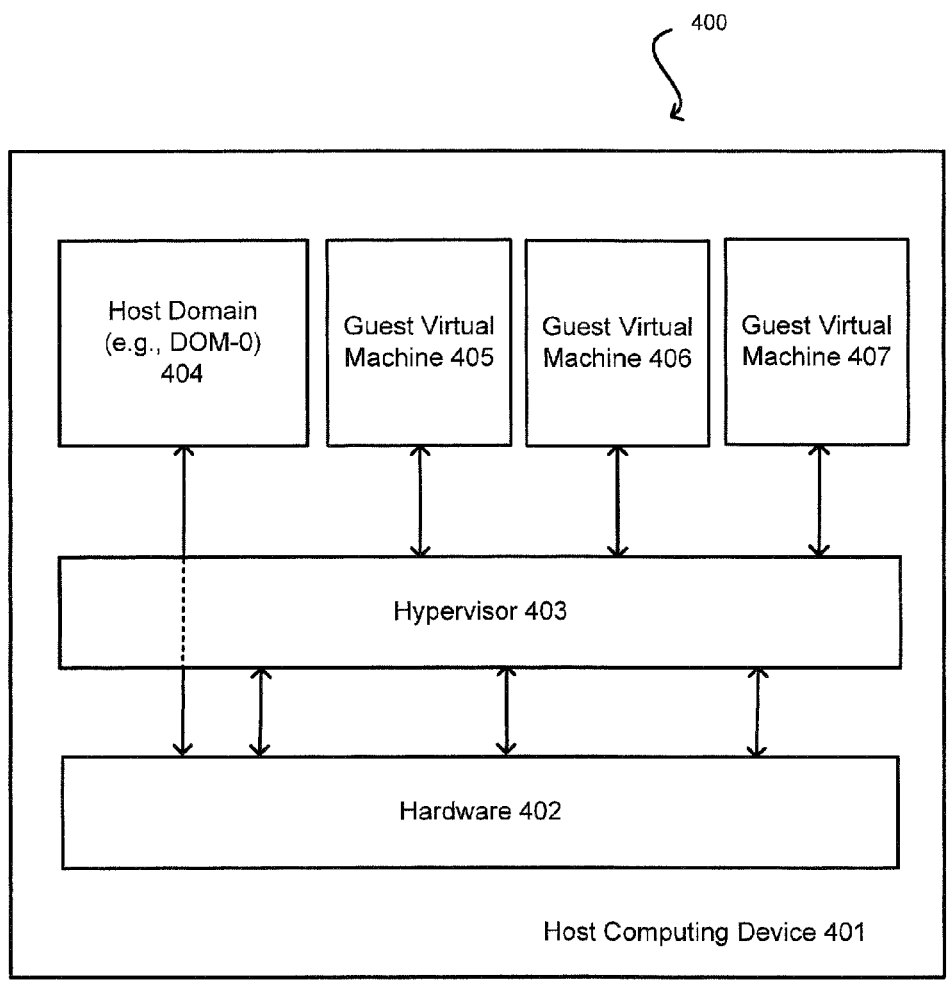
FIG. 4 illustrates an example of utilizing one virtualization technique using a hypervisor, in accordance with various embodiments.

As previously mentioned, the virtual machine may be operating on a host computing device that resides in a resource center of a service provider or other operator of the virtualized computing environment. On the host computing device, a number of virtualization techniques can be used to simultaneously operate a plurality of guest virtual machines or guest operating systems. FIG. 4 illustrates an example 400 of utilizing one virtualization technique using a hypervisor, in accordance with various embodiments. The hardware 402 of the host computing device 401 interfaces with a hypervisor 403 running directly on the hardware 402 (e.g., a "bare metal" or native hypervisor). Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 404 that may include an administrative operating system for configuring the operation and functionality of the hypervisor 403, as well as that of domains of lower privilege, such as the domains of the guest virtual machines (405, 406, 407) or other operating systems, which may be heterogeneous (e.g., running different operating systems than each other). The host domain 404 (e.g., DOM-0) may have direct access to the hardware resources 402 of the host computing device 401 by way of the hypervisor 403, while the guest virtual machine domains (405, 406, 407) may not.

Figure 5:
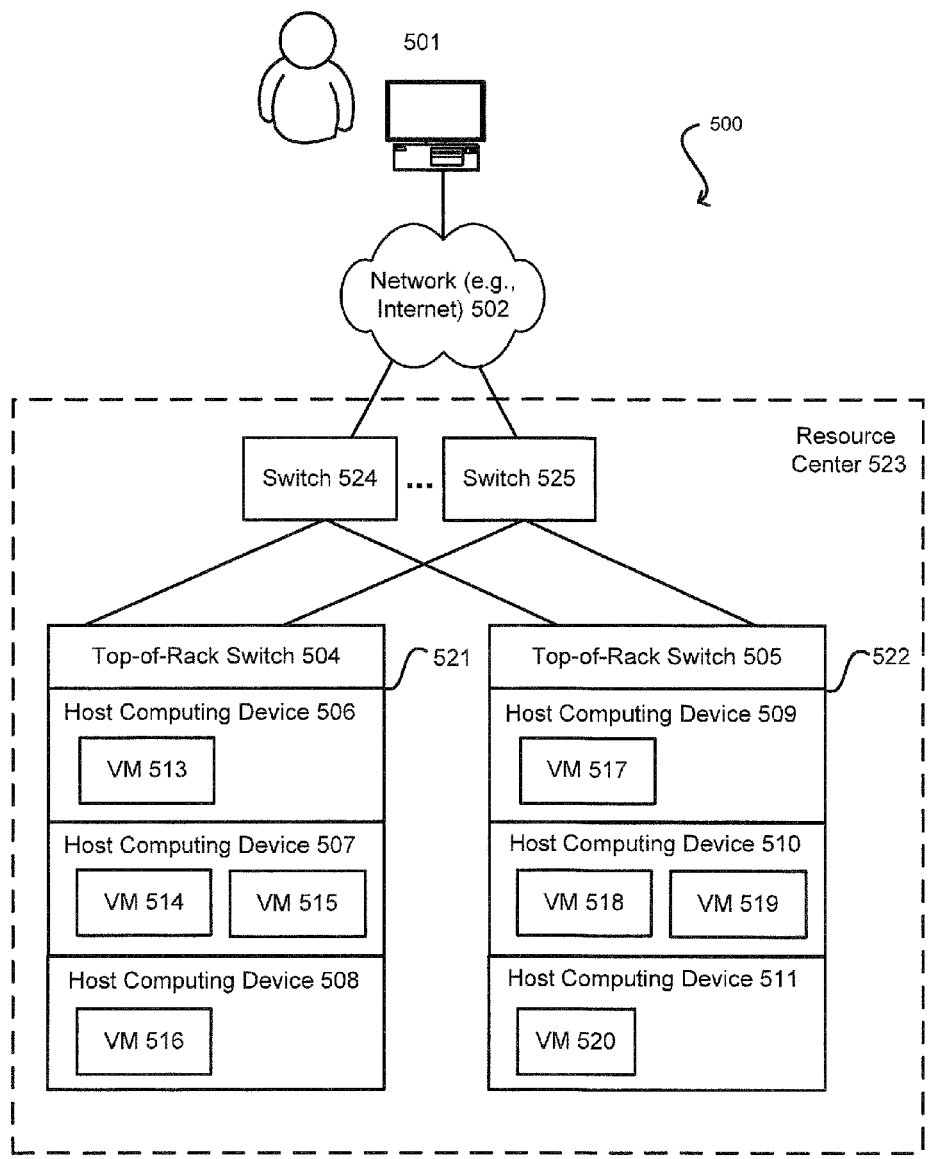
FIG. 5 illustrates an example of a resource center of a service provider that provides the physical resources that can be used to enable a virtualized computing environment, in accordance with various embodiments.

FIG. 5 illustrates an example 500 of a resource center of a service provider that provides the physical resources that can be used to enable a virtualized computing environment, in accordance with various embodiments. In the illustrated embodiment, a service provider (or other operator of the virtualized computing environment) can maintain one or more resource centers 523 (e.g., data centers, server farms, etc.) that store the physical resources (e.g., host computing devices, etc.) of the service provider. The resource centers may be located in different geographic locations to provide improved redundancy and failover, as well as more localized access to resources. The physical resources can be used to host a number of virtual machines or virtual servers that can be provided to users 501 over a network 502, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual networks and the like.

In the illustrated example, the resource center 523 of the service provider may include one or more racks 521, 522 of host computing devices (506, 507, 508, 509, 510) wherein each host computing device on a particular rack is connected to a single top-of-rack (TOR) switch (504, 505). These TOR switches can be further connected to one or more other switches (524, 525) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (513, 514, 515, 516, 517, 518, 519) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider (or other operator) may carry out the processes to provision the virtual machine instance which will be hosted on the physical resources (e.g., host computing devices) of the service provider. When requesting the VM, the user may specify the configuration information to be used with the VM, as previously described.

Figure 6:
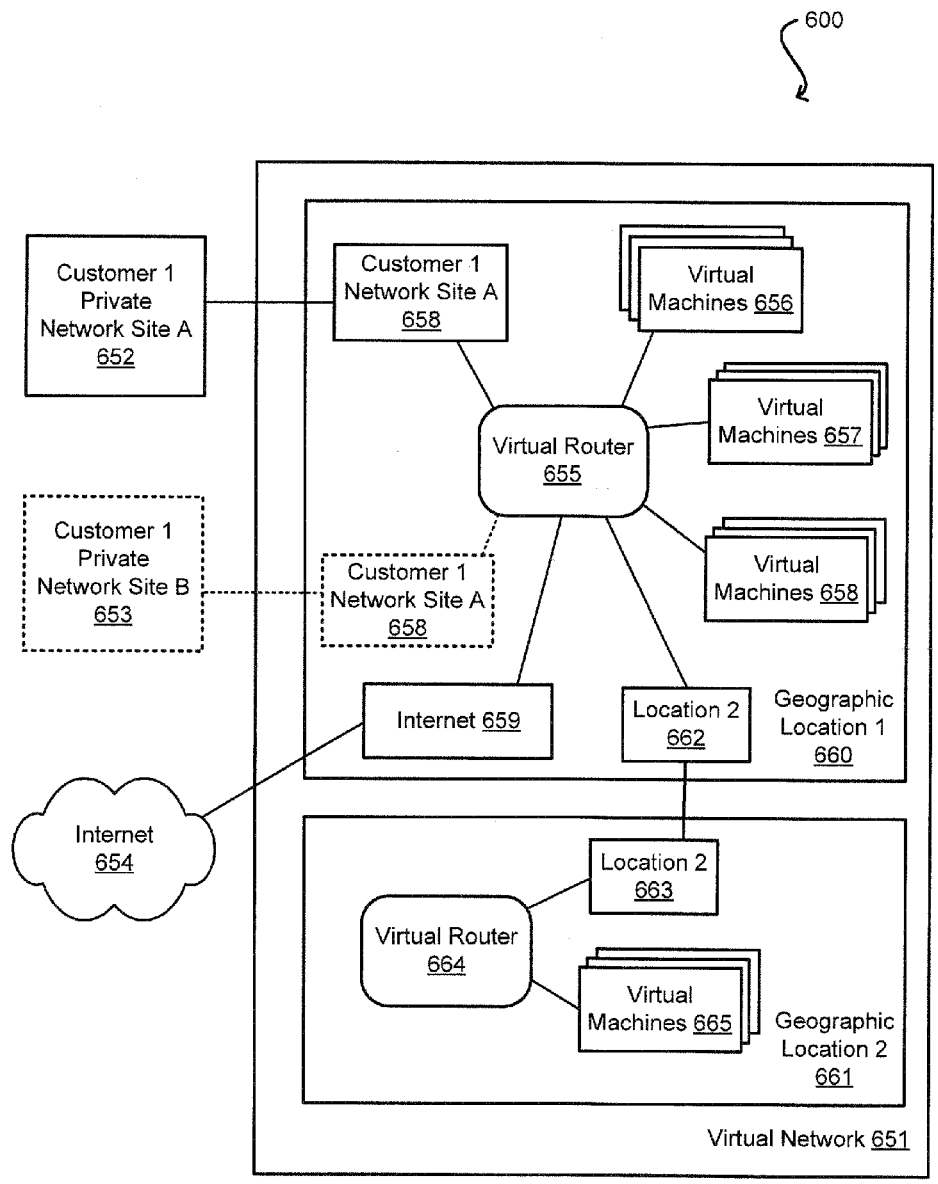
FIG. 6 illustrates an example of a virtual network of multiple virtual machines that can be provided for a user in the virtualized computing environment, in accordance with various embodiments.

As previously described, when the virtual machine is provisioned for the user, it may be associated with a virtual network provisioned for that user. FIG. 6 illustrates an example 600 of a virtual network of multiple virtual machines that can be provided for a user in the virtualized computing environment, in accordance with various embodiments. As previously mentioned, the service provider (or other operator of the virtualized computing environment) can provide a resource center that maintains the physical resources (e.g., host computing devices, etc.) to host the various virtual machines and virtual networks, such as virtual network 651, for one or more customers of the service provider. In some embodiments, the service provider may provide a network service that can be used to create and configure the virtual networks by various customers of the service provider.

In the illustrated example, the virtual network 651 is a private network extension to a remote private computer network of a customer. The virtual network 651 includes various virtual machines that are located at a first geographic location 1 660 (e.g., in a first data center located in the geographic location 1). The virtual machines can be configured into logical groups 657, 658, and 659 (e.g., to correspond to different subnets and associated networking devices not shown). In this example, a single conceptual virtual router 655 is shown in geographic location 1 660 to control communications between those virtual machines and other computing systems, so as to illustrate different types of communications that may occur, although in alternative embodiments, there may be multiple or no configured networking devices at geographic location 1. The virtual network may be implemented in geographic location 1 660 in various manners, such as via multiple physical interconnected routers or other networking devices, by using an underlying substrate network and associated modules that control communications over the underlying network, or the like. In this example, the virtual router 655 operates in accordance with the configured information for the virtual network 651, including configured network topology information, such as may be configured by the customer using the network service provided by the service provider.

In this example, the virtual network 651 is provided for example customer 1, and is a network extension to a remote computer network of customer 1. Customer 1's remote computer network includes multiple computing systems (not shown) at a first remote location, such as Private Network Site A 652, and the virtual router 655 is configured to communicate with those multiple computing systems via a virtual communication link 658. For example, the virtual network may include one or more configured virtual private network (VPN) connections to the multiple computing systems at Site A 652, and the communication link 658 may correspond to one or more such VPN connections. In addition, the remote computer network of customer 1 may optionally include computing systems at one or more other locations, such as the illustrated optional Private Network Site B 653, and if so, the virtual router 655 may further be configured to communicate with those other computing systems at the other locations, such as via an optional virtual communication link 658 to Site B 653 (e.g., via one or more other configured VPN connections directly to Site B). When multiple VPN connections or other secure connections are used to remote computing systems of a remote computer network, each connection may correspond to a subset of the remote computing systems (e.g., by being associated with a subset of the network addresses of the remote computer network that correspond to those computing systems) so as to cause communications to be routed to the appropriate connection. In other embodiments, multiple VPN connections or other secure connections may be used to remote computing systems at one or more locations, but may each support communications to any of the remote computing systems, such as if the multiple connections are redundant alternatives (e.g., used for load balancing). Further, in some embodiments, a client's remote computer network may include multiple computing systems at multiple sites, but only a single VPN connection or other secure connection to the remote computing systems may be used, with the remote computer network being responsible for routing the communications to the appropriate site and computing system.

In addition, the virtual network 651 may be configured to allow all, some or no communications between the virtual machines of the virtual network and other external computing systems that are generally accessible on the Internet 654 or other public networks. If at least some such external communications are allowed, the virtual router 655 may further be configured to communicate with those external multiple computing systems via an optional virtual communication link 659.

In the illustrated embodiment, in addition to the virtual machines (656, 657, 658) at geographic location 1 660, the virtual network may further include virtual machines 665 that are located at a second geographic location 2 661 (e.g., at a distinct second resource center at the geographic location 2). Accordingly, the virtual router 655 may be configured to include a virtual communication link 662 to the portion of the virtual network at the geographic location 2 661. In this example, the portion of the virtual network at the geographic location 2 661 similarly is illustrated with a conceptual virtual router 664 to manage communications to and from the virtual machines 665, including to communicate with the portion of the virtual network at the geographic location 1 660 via a virtual communication link 663. Such communications between virtual machines of the virtual network at different geographic locations may be handled in various manners in various embodiments, such as by sending the communications over the Internet or other public networks (e.g., as part of a secure tunnel using encryption) by sending the communications in a private secure manner (e.g., via a dedicated lease line between the geographic locations), etc. In addition, while not illustrated here, the portion of the virtual network at the geographic location 2 may similarly include other virtual communication links, such as to remote client private networks (e.g., via one or more VPN connections distinct from any VPN connections to the geographic location 1), to the Internet, etc.

As previously described, when a virtual machine is provisioned for a user (e.g., customer 1), it may be added to the virtual network of that user. In some embodiments, the user may provide a list of approved cryptographic measurements and specify that all virtual machines belonging to their virtual network need to match at least one of those cryptographic measurements. In these embodiments, when the user requests additional virtual machines to be provisioned for their virtual network, the operator may select a host computing device and generate the cryptographic measurements for the resources of that host and then compare the cryptographic measurements to the list of approved measurements initially provided by the user. If the host computing devices does not match one of the approved measurements, the virtual machine is not added to the virtual network of the user.

Figure 7:
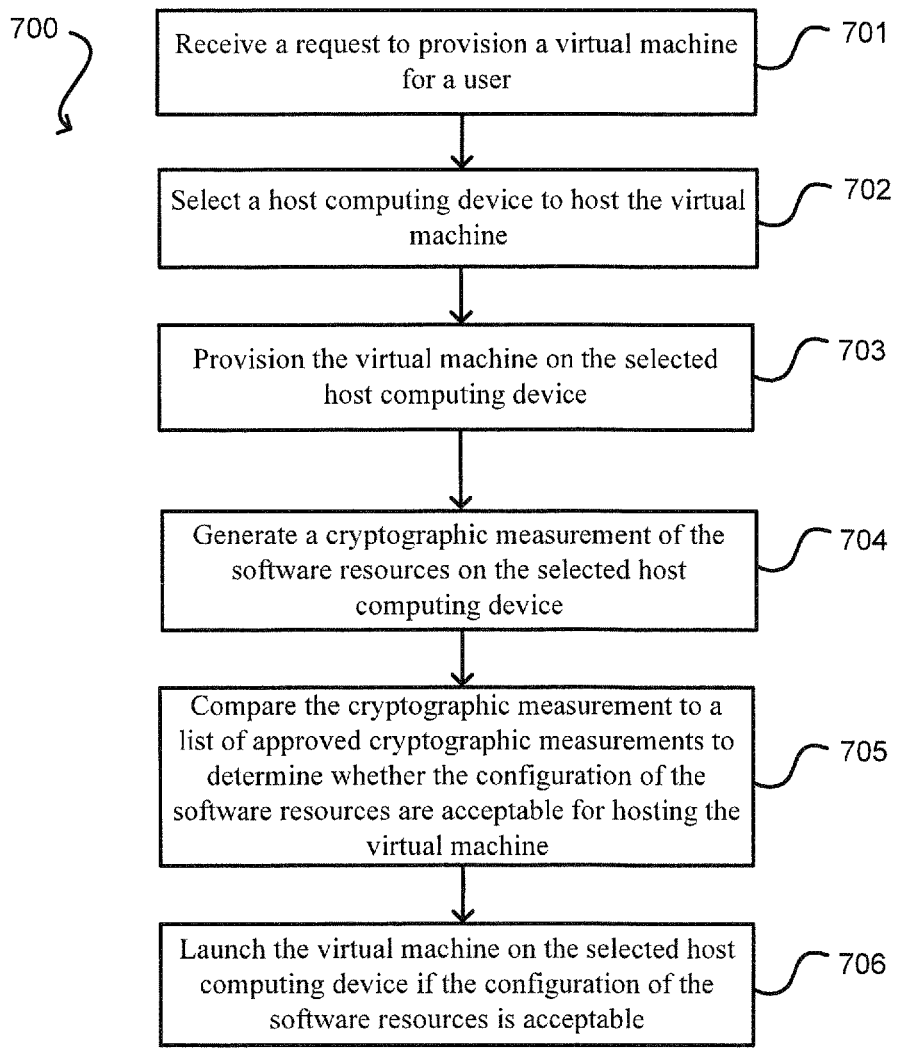
FIG. 7 illustrates an example of a process for attesting computing resources that are configured to host a virtual machine, in accordance with various embodiments.

FIG. 7 illustrates an example of a process 700 for attesting computing resources that are configured to host a virtual machine, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, a request to provision a virtual machine for a user is received. The request may be submitted by a user by accessing one or more APIs, as previously described. In some embodiments, as part of submitting the request, the user may specify a particular configuration that the host computing device will need to comply with in order to host the user's virtual machine. In response to receiving the request, the operator of the multitenant environment may select a host computing device for hosting the virtual machine, as shown in operation 702. In various embodiments, the selected host computing device includes software and hardware resources for executing the virtual machine. For example, the resources may include a hypervisor and host domain (or a virtual machine monitor) for hosting multiple virtual machines on the device.

In operation 703, the operator provisions the virtual machine on the selected host computing device. Once the virtual machine has been provisioned and is ready to be launched, the operator generates a cryptographic measurement (e.g., hash measurement) of the software and/or hardware resource configuration on the host computing device, as shown in operation 704. In some embodiments, a TPM embedded in the host computing device may be utilized in generating the cryptographic measurements.

In operation 705, the operator retrieves a list of approved cryptographic measurements. In various embodiments, this list of approved hash measurements may be provided by the user or compiled by the operator and attested to by a trusted third party. In yet other embodiments, the trusted third party may publish the list of approved cryptographic measurements, such as by making it accessible to users over the internet. Once the list if obtained, the hash measurement generated on the selected host device can be compared to the list of approved hash measurements to determine whether the resources on the selected host computing device are acceptable for hosting the virtual machine. If the cryptographic measurement matches one of the measurements on the list of approved measurements, the virtual machine is launched on the host computing device, as shown in operation 706. In embodiments where the user has specified a particular configuration of the host computing device as part of the original request, there may not need to be any list of approved measurements. Rather, the cryptographic measurement obtained by the TPM may simply be compared with a known and approved measurement that corresponds to the particular configuration specified by the user in order to determine whether the configuration of the host is acceptable. In some embodiments, information about whether the measurements match can be provided back to the user, such as by enabling a user to access an API that provides this information.

Figure 8:
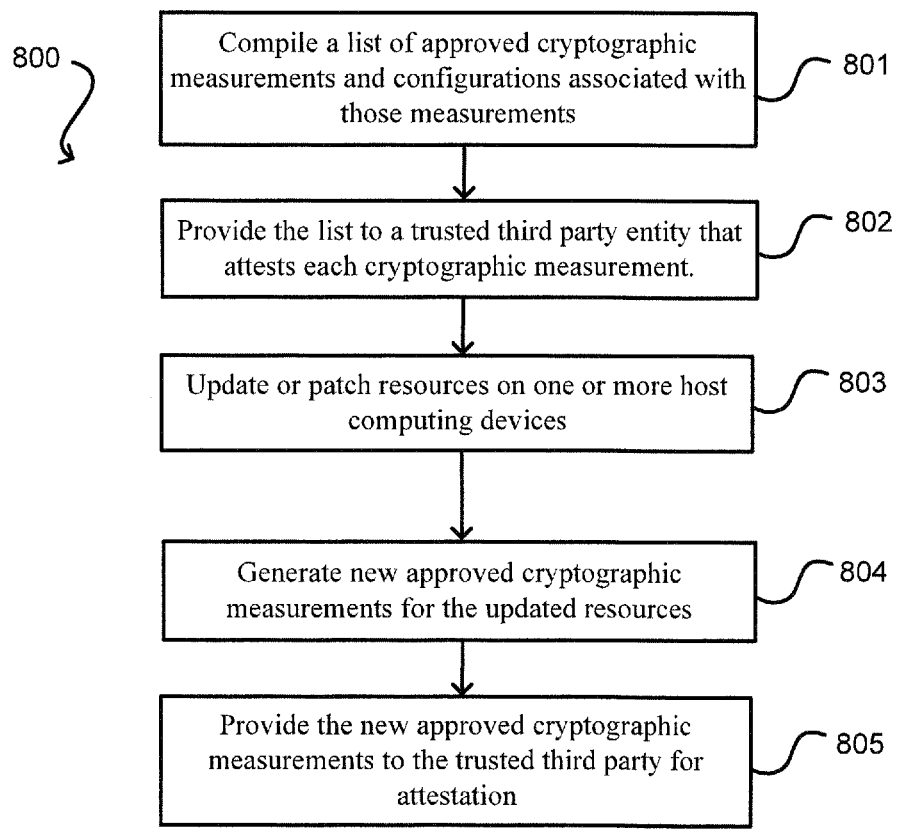
FIG. 8 illustrates an example of a process for compiling a list of approved cryptographic measurements and providing the list to a trusted third party, in accordance with various embodiments.

FIG. 8 illustrates an example of a process 800 for compiling a list of approved cryptographic measurements and providing the list to a trusted third party, in accordance with various embodiments. In operation 801, the operator of the multitenant environment compiles a list of approved cryptographic measurements and the software and/or hardware configurations corresponding to those measurements. In operation 802, the list of approved measurements is provided to a trusted third party. The trusted third party may analyze the approved measurements and attest to their accuracy. Once the trusted party has attested the accuracy of the list of measurements, various users may rely on the measurements in the list when requesting their virtual machines to be launched, as previously described.

In operation 803, the operator of the multitenant environment may, from time to time, update or patch the various resources (e.g., hypervisors, etc.) used to host the virtual machines. For example, the service provider or operator of the multitenant environment may introduce new infrastructure and new components (e.g., new hardware with a different BIOS, etc.) to the multitenant environment. In many cases, such updates, patches or new components may require new cryptographic measurements to be generated for those resources. In operation 804, the operator generates the new cryptographic measurements corresponding to the updated resources and in operation 805, the operator provides those measurements to the trusted third party. The trusted third party may then attest the new cryptographic measurements and the users may continue relying on them.

Figure 9:
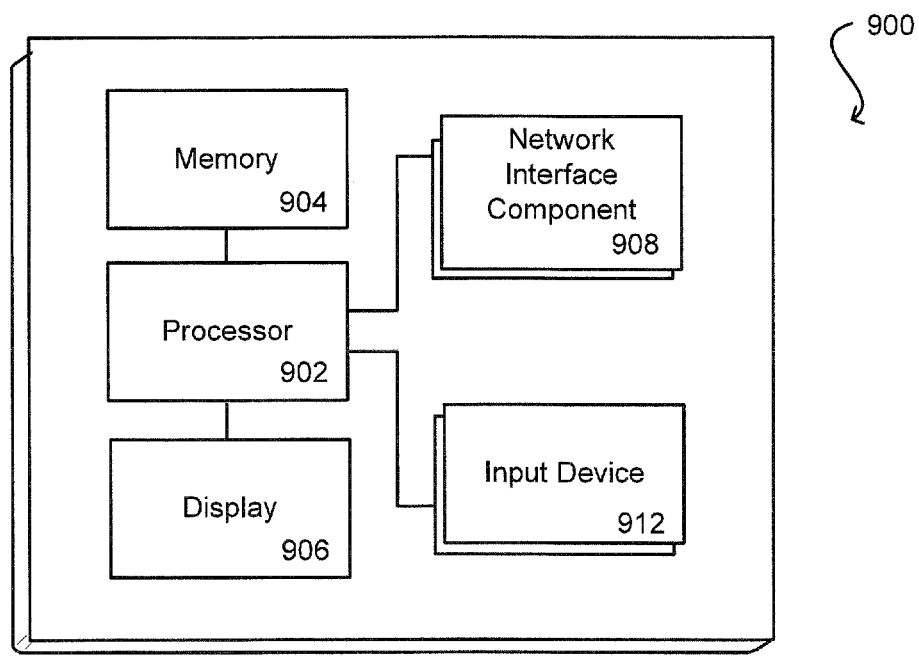
FIG. 9 illustrates a logical arrangement of a set of general components of an example computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc.

The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Figure 10:
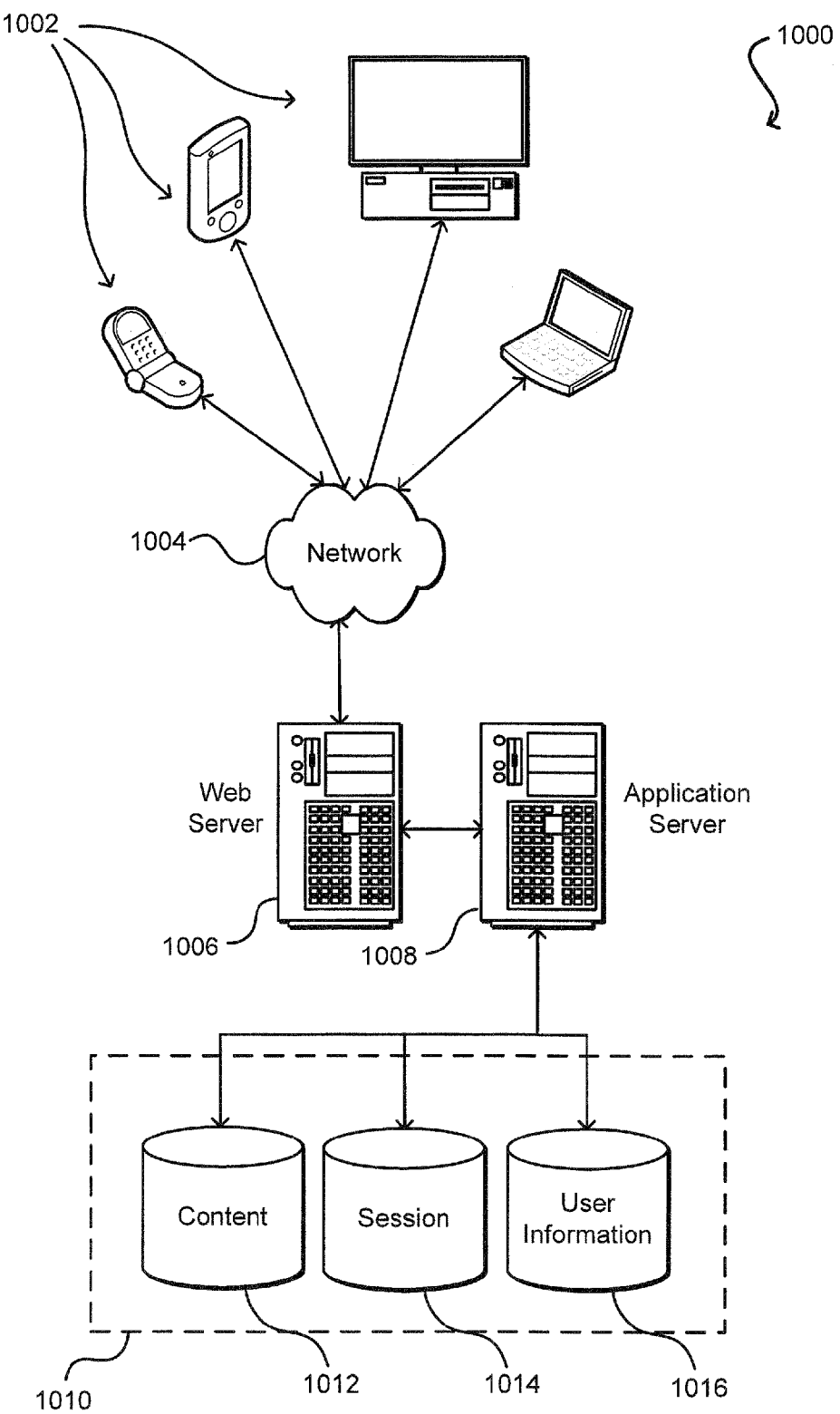
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 716, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing one or more sequences of instructions, which when executed by one or more processors to cause a computing system to:
  receive a request to provision a virtual machine for a customer, the request received from a customer of a service provider hosting a multitenant computing environment;
  select a host computing device from a plurality of host computing devices to host the virtual machine, the selected host computing device including one or more resources for executing the virtual machine;
  provision the virtual machine on the selected host computing device;
  generate a hash measurement of a configuration of the one or more resources on the selected host computing device;
  obtain, from the customer, an indication of whether the configuration of the one or more resources is acceptable for hosting the virtual machine, the indication being based at least in part on a comparison between the hash measurement and a list of approved hash measurements; and
  launch the virtual machine on the selected host computing device in response to the indication that the configuration of the one or more resources is acceptable.

2. The non-transitory computer readable storage medium of claim 1, wherein the list of approved hash measurements is a trusted list attested to by a trusted third party.

3. The non-transitory computer readable storage medium of claim 1, wherein the hash measurement is based at least in part on one or more of:
  values associated with a basic input/output system (BIOS) of the host computing device;
  configuration of a hypervisor of the host computing device;
  configuration of a boot operating system of the virtual machine;

values in one or more hardware configuration registers; or firmware in a peripheral component interconnect (PCI) card.

4. The non-transitory computer readable storage medium of claim 1, further comprising instructions executed by one or more processors to cause a computing system to:
provide the hash measurement to the customer in response to the request to provision the virtual machine.

5. A computer implemented method, comprising:
receiving a request to provision a virtual machine for a user;
selecting a host computing device for hosting the virtual machine, the host computing device including one or more resources for executing the virtual machine;
obtaining a cryptographic measurement of the one or more resources on the selected host computing device;
receiving a selection of a configuration of the host computing device from the user;
determining an approved cryptographic measurement associated with the selected configuration of the host computing device;
verifying that the cryptographic measurement matches the approved cryptographic measurement associated with the selected configuration of the host computing device; and
providing the user with access to the virtual machine on the host computing device.

6. The computer implemented method of claim 5, wherein providing the user with access to the virtual machine further comprises:
providing the cryptographic measurements to the user in response to the request to provision the virtual machine;
receiving an indication from the user, indicating whether the cryptographic measurement is approved by the user; and
launching the virtual machine on the host computing device in response to receiving an indication that the cryptographic measurement is approved.

7. The computer implemented method of claim 5, wherein providing the user with access to the virtual machine further comprises:
retrieving a list of approved cryptographic measurements;
comparing the cryptographic measurement to the list of approved cryptographic measurements to determine whether the one or more resources on the selected host computing device are acceptable for hosting the virtual machine; and
launching the virtual machine on the selected host computing device in response to determining that the one or more resources are acceptable.

8. The computer implemented method of claim 7, wherein the list of approved cryptographic measurements is provided by the user along with the request to provision the virtual machine.

9. The computer implemented method of claim 5, wherein the approved cryptographic measurement is generated by a trusted third party and attested to by the trusted third party.

10. The computer implemented method of claim 5, further comprising:
compiling a list of approved cryptographic measurements for a plurality of configurations for host computing devices; and
providing the list of approved cryptographic measurements to a trusted third party to be attested to by the trusted third party.

11. The computer implemented method of claim 10, further comprising:

determining that at least one of a plurality of host computing devices has been patched or updated; and
updating the list of approved cryptographic measurements with a new cryptographic measurement to account for the patch or update to the host computing devices.

12. The computer implemented method of claim 10, wherein the list of approved cryptographic measurements is published by the trusted third party to be accessible over a network by a plurality of users.

13. The computer implemented method of claim 5, wherein the cryptographic measurement is based at least in part on one or more of:
values associated with a basic input/output system (BIOS) of the host computing device;
configuration of a hypervisor of the host computing device;
configuration of a boot operating system of the virtual machine;
values in one or more hardware configuration registers; or
firmware in a peripheral component interconnect (PCI) card.

14. A computing system, comprising:
at least one processor; and
memory including instructions that, when executed by the processor, cause the computing system to:
receive a request to provision a virtual machine for a user;
select a host computing device for hosting the virtual machine, the host computing device including one or more resources for executing the virtual machine;
obtain a cryptographic measurement of the one or more resources on the selected host computing device;
receive a selection of a configuration of the host computing device from the user;
determine an approved cryptographic measurement associated with the selected configuration of the host computing device;
verify that the cryptographic measurement matches the approved cryptographic measurement associated with the selected configuration of the host computing device; and
provide the user with access to the virtual machine on the host computing device.

15. The computing system of claim 14, wherein providing the user with access to the virtual machine further comprises:
providing the cryptographic measurements to the user in response to the request to provision the virtual machine;
receiving an indication from the user, indicating whether the cryptographic measurement is approved by the user; and
launching the virtual machine on the host computing device in response to receiving an indication that the cryptographic measurement is approved.

16. The computing system of claim 14, wherein providing the user with access to the virtual machine further comprises:
retrieving a list of approved cryptographic measurements;
comparing the cryptographic measurement to the list of approved cryptographic measurements to determine whether the one or more resources on the selected host computing device are acceptable for hosting the virtual machine; and
launching the virtual machine on the selected host computing device in response to determining that the one or more resources are acceptable.

17. The computing system of claim 16, wherein the list of approved cryptographic measurements is provided by the user along with the request to provision the virtual machine.

18. The computing system of claim 14, wherein the memory further comprises instructions executed by the at least one processor to cause the computing system to:
- compile a list of approved cryptographic measurements for a plurality of configurations for host computing devices; and
- provide the list of approved cryptographic measurements to a trusted third party to be attested to by the trusted third party.

19. The computing system of claim 18, wherein the memory further comprises instructions executed by the at least one processor to cause the computing system to:
- determine that at least one of a plurality of host computing devices has been patched or updated; and
- update the list of approved cryptographic measurements with a new cryptographic measurement to account for the patch or update to the host computing devices.

20. The computing system of claim 18, wherein the list of approved cryptographic measurements is published by the trusted third party to be accessible over a network by a plurality of users.

\* \* \* \* \*